United States Patent
Shimomura

(10) Patent No.: US 6,928,278 B2
(45) Date of Patent: Aug. 9, 2005

(54) AUTHENTIC PERSON IDENTIFICATION

(75) Inventor: Satoshi Shimomura, Tokyo (JP)

(73) Assignee: Konami Corporation, Tokyo (JP)

( * ) Notice: Subject to any disclaimer, the term of this patent is extended or adjusted under 35 U.S.C. 154(b) by 480 days.

(21) Appl. No.: 09/865,668

(22) Filed: May 29, 2001

(65) Prior Publication Data

US 2001/0049273 A1 Dec. 6, 2001

(30) Foreign Application Priority Data

May 30, 2000 (JP) ........................................ 2000-159530

(51) Int. Cl.⁷ .......................... H04M 3/42; H04M 3/16; H04M 1/00; H04H 9/00; H04H 7/00
(52) U.S. Cl. ........................ 455/411; 455/410; 455/415; 455/416; 455/2.01; 455/3.06; 455/550.1
(58) Field of Search ................................ 455/2.01, 3.01, 455/3.03, 3.04, 418–420, 462–463, 550.1, 410, 411, 412.1, 412.2, 414.1, 414.2, 414.3, 415, 416; 380/229, 232, 236, 339, 240, 241, 242; 463/9, 27, 29, 39

(56) References Cited

U.S. PATENT DOCUMENTS

| | | | | |
|---|---|---|---|---|
| 4,767,335 A | * | 8/1988 | Curt | 434/352 |
| 4,860,352 A | * | 8/1989 | Laurance et al. | 380/258 |
| 5,179,517 A | * | 1/1993 | Sarbin et al. | 463/25 |
| 5,195,134 A | * | 3/1993 | Inoue | 380/242 |
| 5,689,790 A | * | 11/1997 | Kubo et al. | 399/343 |
| 5,754,939 A | * | 5/1998 | Herz et al. | 455/3.04 |
| 5,768,382 A | * | 6/1998 | Schneier et al. | 463/40 |
| 5,999,808 A | * | 12/1999 | LaDue | 455/412.2 |
| 6,130,898 A | * | 10/2000 | Kostreski et al. | 370/522 |
| 6,193,610 B1 | * | 2/2001 | Junkin | 463/40 |
| 6,203,433 B1 | * | 3/2001 | Kume | 463/42 |
| 6,224,486 B1 | * | 5/2001 | Walker et al. | 463/42 |
| 6,285,868 B1 | * | 9/2001 | LaDue | 455/410 |
| 6,401,206 B1 | * | 6/2002 | Khan et al. | 713/176 |
| 6,554,707 B1 | * | 4/2003 | Sinclair et al. | 463/39 |
| 6,569,012 B2 | * | 5/2003 | Lydon et al. | 463/9 |
| 6,570,080 B1 | * | 5/2003 | Hasegawa et al. | 84/609 |
| 2002/0049507 A1 | * | 4/2002 | Hameen-Anttila | 700/92 |

FOREIGN PATENT DOCUMENTS

| | | | | |
|---|---|---|---|---|
| JP | 08079357 A | * | 3/1996 | .......... H04M/1/27 |
| JP | 09162979 A | * | 6/1997 | .......... H04M/3/42 |
| JP | P2000-22827 A | | 1/2000 | |
| WO | WO 97/19537 A1 | | 5/1997 | |

* cited by examiner

Primary Examiner—William Trost
Assistant Examiner—Meless Zewdu
(74) Attorney, Agent, or Firm—Sughrue Mion, PLLC

(57) ABSTRACT

In a communication system which can privately inform each applicant of an outcome of a game or an examination, a cell phone with a cell phone number is used to transmit, to a center or a promoter, personal identification information including the cell phone number and a total personal password. The total personal password is obtained by producing the personal identification information, by producing the result of the game or examination as a parameter, and by encrypting both the personal identification information and the result. The center extracts the personal identification information from the total personal password decrypted and collates the extracted personal identification information with the received information so as to judge whether or not a person is authentic. When confirmation is made about the fact that the person is authentic, the parameter is extracted from the total personal password to be judged. An outcome of judgement is transmitted to each person by the use of the cell phone number. The total personal password may be transmitted to the center through a network.

11 Claims, 3 Drawing Sheets

AUTHENTIC PERSON IDENTIFICATION

BACKGROUND OF THE INVENTION

This invention relates to a method a recording medium, a program processing device, a mobile radio communication system, a communication device, and a communication system all of which send/receive person identification information so as to identify each person.

Recently, a portable or cell phone has remarkably become popular in the world and a wide variety of services have also been proposed which can be utilized by the cell phone. On the other hand, users of the internet have rapidly increase. Under the circumstances, proposals have also been made about a service of accessing the internet from a cell phone. Thus, as communication becomes, heavily important, a technique becomes seriously significant which can identify each person who is being carrying out communication and who is certainly authentic.

Conventionally, use has been made of a code number, such as a key word, a password, and a complicate processing has been usually utilized to carry out encryption, and the like.

Now, there are a number of television programs which may be called audience participation programs and with which audiences can participate. As such audience participation programs, there are also a lot of audience participation programs that the audiences play games, dances, techniques and compete with one another in the programs. In such audience participation programs, an audition has been often held among contestants gathered from a great number of the audiences before the audience participation programs are broadcast, so as to select person or persons appropriate for the programs.

When such an audition has been held, it often happens that a great number of contestants, or candidates of, for example, 500,000 participate with the audition. In this event, the contestants are at first screened by examining contestants' papers or documents. Such screening the contestants by examining the papers tends to consume a lot of times, labor, and expense. In addition, even when the contestants are selected as candidates by examining the papers, all of the candidates must be further tested by actually giving performances before judges. In other words, the judges must watch all performances of the candidates and select a predetermined number of persons from the candidates. However, such watching and selecting need a long time and a lot of labor.

In the interim, similar tests or trial examinations have been carried out in schools, coaching schools, or the like. Results of such tests or trial examinations have been individually informed by examination papers given to candidates and published in the form of a scholastic list of predetermined students.

At any rate, it is to be noted that no consideration has been made at all about using a cell phone or an internet so as to individually or privately inform candidates of results of an audition, tests, or trial examinations. Even if attention is directed to using the internet so as to privately inform the candidates of the results, no proposal has been yet made about an effective and simple communication method of identifying that each person is authentic.

SUMMARY OF THE INVENTION

It is an object of this invention to provide a communication method which can effectively and simply communicate personal identification information.

It is another object of this invention to provide a communication method of the type described, which is suitable for selecting candidates of a predetermined level and which can privately and individually inform each candidate of results of either pass or failure.

It is still another object of this invention to provide a communication method of the type described, which is capable of simply identifying that each candidate is authentic.

It is yet another object of this invention to provide a computer-readable recording medium and a program which are suitable for transmitting personal identification information.

It is another object of this invention to provide a communication system which can simply identify a person is authentic.

It is a further object of this invention to provide a communication device which can notify an authentic person alone after certainly identifying that a person is authentic from personal identification information.

According to this invention, there is provided a method of carrying out communication between a center side and a personal terminal owned by a person and assigned with personal identification information, comprising the steps of obtaining, as personal record data, a result of a workout exercised by the person; producing a total personal password with reference to the personal identification information and the personal record data; and transmitting the total personal password together with the personal identification information to the center side.

According to this invention, there is also provided a computer-readable recording medium which stores a program, the program comprising the steps of requesting a person using the recording medium to input personal identification information; generating an execution result obtained by executing the program; and producing a total personal password of the person from the personal identification information and the execution result.

According to this invention, there is also provided a program processing device for processing a program stored in a computer-readable recording medium by attaching the recording medium to the program processing device, wherein the program comprises the steps of inputting personal identification information concerned with a person who uses the recording medium; generating an execution result obtained by executing the program; and generating a total personal password concerned with the person on the basis of the personal identification information and the execution result.

According to this invention, there is also provided a mobile communication system comprising a program processing device for processing a program stored in a recording medium attached thereto and a mobile terminal communicable with the program processing device, wherein the program processing device comprises means for inputting personal identification information representative of a person using the recording medium; means for executing the program to produce a result of executing the program; means for generating a total personal password related to the person on the basis of the personal identification information and the result of executing the program; the mobile terminal comprising means for transmitting the personal identification information and the total personal password.

According to this invention, there is also provided a communication device operable in response to personal identification information for identifying each person and a total personal password composed of the personal identification information and personal record data concerned with the person, comprising collating means for collating the personal identification information with interpreted personal identification information obtained by processing the total personal password received; detecting means for detecting whether or not the interpreted personal identification information is coincident with the personal identification information received, to produce coincident and noncoincident signals; and judging means for judging that the person is authentic and not authentic in response to the coincident and the noncoincident signals, respectively.

According to this invention, there is also provided a communication system for use in carrying out communication between a subscriber terminal and a server both of which are connected to each other through a network, with the subscriber terminal assigned with a password corresponding to the server, wherein the server comprises delivering means for delivering an exercise and/or a game to the subscriber terminal while the subscriber terminal comprises reply transmission means for transmitting an answer/an execution result of the subscriber to the exercise and/or the game to the server.

DESCRIPTION OF THE PREFERRED EMBODIMENTS

Figure 1:
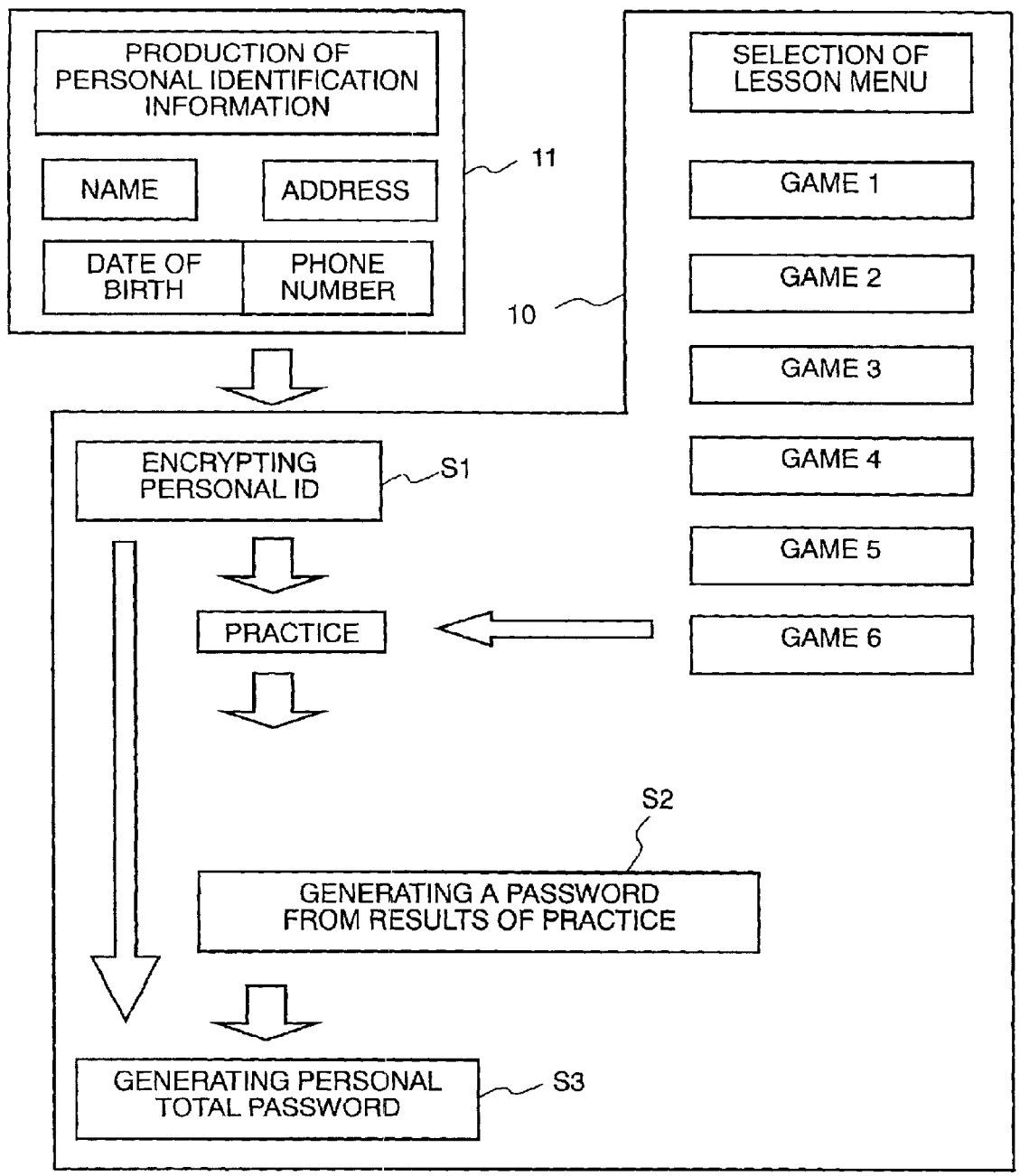
FIG. 1 shows a schematic view for describing an encryption method used in a personal information communication method according to an embodiment of this invention.

Referring to FIG. 1, description will be made about a communication system according to an embodiment of this invention. In the illustrated example, the communication system is mainly used for transmitting personal information and may be therefore called a personal information communication system. Herein, it is assumed that this invention is applied to an audition system that selects a particular person from contestants or applicants.

In order to enter the audition, it is surmised that candidates should exercise or play a predetermined game stored in a computer-readable recording medium, such as a CD-ROM, a semiconductor memory, to obtain a result of a workout and that a preliminary examination is made about the results of the workouts to screen the candidates into contestants. Moreover, the particular person is finally determined from the contestants who pass the preliminary examination.

Thus, the contestants are selected from the candidates by the preliminary examination. In such a preliminary examination, judgement is made about whether or not each candidate fulfills or clears a prescribed condition determined in connection with the predetermined game. The prescribed condition may be, for example, a predetermined score, level, and/or rank.

Specifically, the candidates transmit their results, such as scores, to a promoter of the audition, without being aware of their results in a manner to be described later in detail. From the promoter side, certificates are delivered in the preliminary examination only to successful candidates who fulfill the prescribed condition. As a result, the candidates are selected as the contestants who attend the audition.

In this event, it is presumed that the candidates are possessed of their own cell phones, subject games of the audition, and game machines which can perform the games in question. Such game machines may be, for example, home game machines, portable game machines, or the like, although each candidate is assumed to play and perform the game in question by the use of the home game machine.

Now, description will be directed to the computer-readable recording medium (depicted by 10), which may be, for example, a CD-ROM, and which is usable in this invention. The illustrated recording medium 10 stores first through sixth game programs that are explained as Games 1 through 6, respectively, and that may include music games, such as key board games, drum games, vocal games, and so on. Results of performances are stored in a known manner in a memory card 11 which is usually structured by a flash memory. This shows that the illustrated game machine has both the recording medium 10 and the memory card 11. Such a game machine is well known in the art and will not be described in detail.

As shown in FIG. 1, the memory card 11 has a personal information storage area for storing personal identification information. In the personal information storage area, personal identification information is stored by manipulating the memory card 11 or the game machine and may be, for example, a player's name, address, the date of birth, a phone number assigned to the cell phone.

Herein, the illustrated recording medium 10 be attached to the game machine. In this state, when a power switch is turned on, the game programs (Games 1 to 6) are selectively delivered to a main memory of the game machine in accordance with an OS. Under the circumstances, an image of a lesson menu is displayed on a display device (not shown). From the lesson menu image, it is assumed that the player selects one of the games that is designated by the audition and exercises or plays the selected game.

On the other hand, the personal identification information stored in the memory card 11 is encrypted into an encrypted code in accordance with a known encrypting algorithm predetermined for the recording medium 10, as depicted by a step S1. In the illustrated example, results of practice or workout are obtained by practicing or executing the games stored in the recording medium 10 and are also encrypted in accordance with the above-mentioned algorithm together with parameters used in the games. Such parameters may represent levels or ranks of the player. Such results of execution or practice are generated in the form of a password, as shown at a step S2 in FIG. 1.

Subsequently, the encrypted personal identification information (generated at the step S1) is combined with the password generated at the step S2 and is further encrypted into a total personal password in accordance with the above algorithm. As a result, the total personal password carries the personal ID information and the results of practice encrypted, as shown at a step S3.

Such a total personal password encrypted may be displayed on the display device of the game machine in the form of an unrecognizable image by the player. Under the circumstances, it is very difficult for the players themselves to recognize inclusion of both the personal ID information and the results of practice in the encrypted total personal password. For brevity of description, the encrypted total personal password will be simply called a total personal password below.

Figure 2:
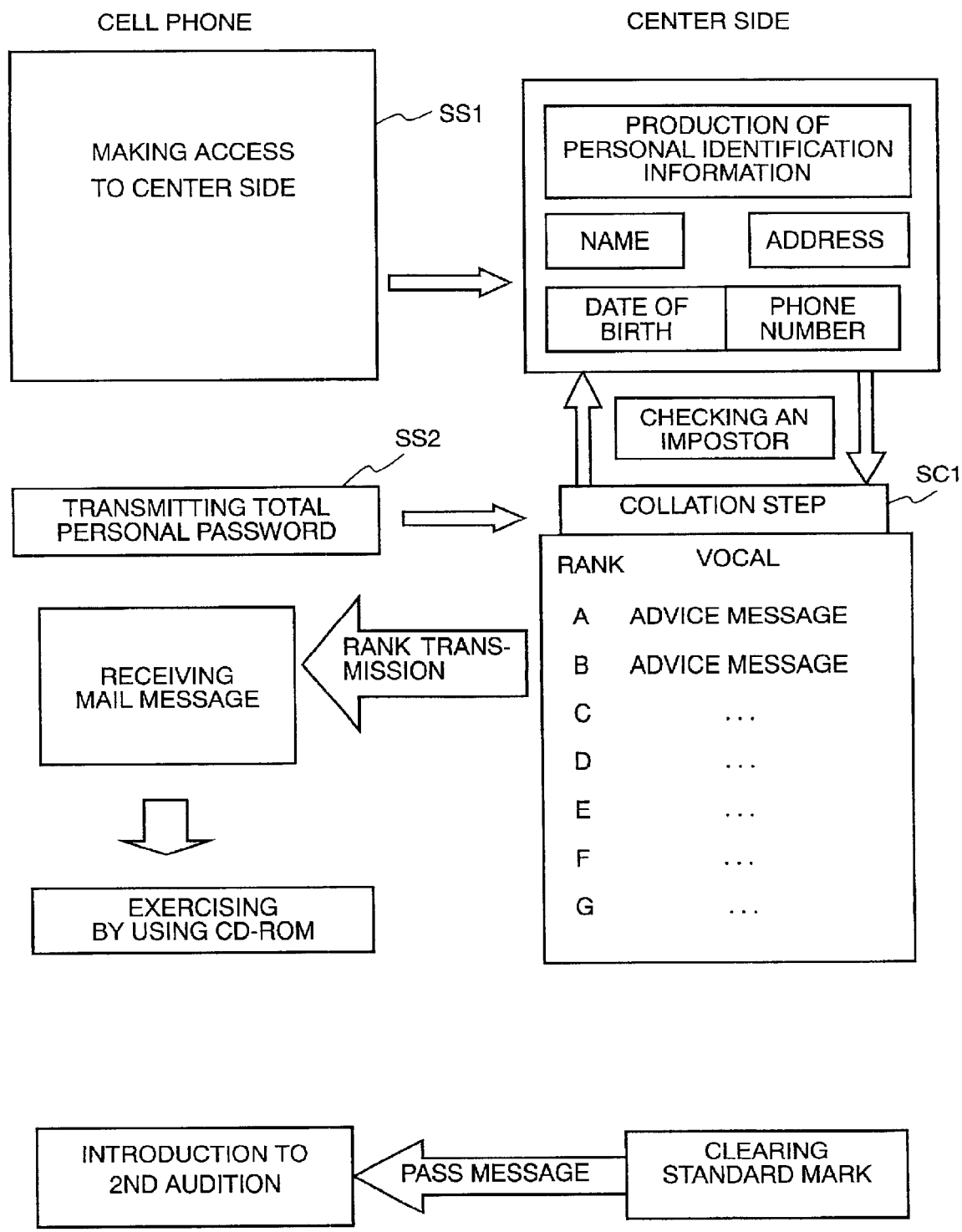
FIG. 2 shows a flow chart for use in describing the personal information communication method according to the embodiment of this invention.

Referring to FIG. 2, the total personal password obtained by playing or executing the game in the recording medium 10 (FIG. 1) is transferred to a cell phone of the player or a personal digital assistant (PDA) device in a known manner. Specifically, such transferring the total personal password to another radio communication device can be achieved by a manual operation of the player or by automatically using a transfer function installed in the home game machine.

In FIG. 2, the player makes access to a center side, namely, a promoter side of the audition at a step SS1 to transmit the above-mentioned total personal password from the cell phone to the center side. Responsive to the total personal password, the promoter decides whether or not the player passes the preliminary examination.

Herein, it is assumed that a calling number display service which is installed in the cell phone owned by the player is selected by the player and that a calling phone number assigned to the player's cell phone is displayed on a display device of the center side. In this event, the promoter side can simply know the cell phone number of the player transmitted from the player. On the other hand, when the player does not receive the calling number display service, the center side requests the player to send the player's phone number. In this case, the center side may request the player to input the player's name, address, the date of birth, a personal identification number, and the like.

At any rate, when the center side is connected to the cell phone by the player's access operation, message accounting or billing is automatically started and the center side sends the player a request message which requests transmission of a password of the player to the center side.

Responsive to the request message, the player operates a key or keys on the cell phone to send the total personal password to the center side.

Supplied with the total personal password encrypted, the center side interprets the total personal password into the player's name, address, the date of birth, and the cell phone number as interpreted identification information. Such an interpreting operation can be readily made by executing inverse transform operation in accordance with the algorithm used in the encryption.

Next, the center side or the promoter collates, at a step Sc1 of FIG. 2, the phone number (or any other personal identification information) sent or notified from the player or a caller with the interpreted identification information obtained by interpreting the encrypted total personal password. As a result of the collation, when no coincidence is detected by the center side between the notified phone number (or the notified personal identification information) and the interpreted identification information, the center side judges that the player or caller is not authentic. When the center side judges that the player is not authentic, no reply is sent from the center side to the player in the illustrated example.

On the other hand, when the notified personal phone number (or the notified personal identification information) is coincident with the interpreted identification information, the center side judges that the player is authentic and accesses to apply for the audition. Thus, it is possible to detect or check an imposter by the above-mentioned collation. On detecting the coincidence by the collation, the center side extracts parameters which are included in the interpreted personal identification information and which specify the results of executing the game by the caller. Thereafter, the center side grades the player in question to decide whether or not the player passes the audition. In the example illustrated, the center sides transmits, to the player or applicant, an advice message indicative of a reason of failure and the like, in addition to the decision to pass or fail the player.

The decision to pass or fail the player and/or the advice message is sent from the center side only to the cell phone of the phone number used in accessing the center side. This shows that the result of the audition, namely, the decision to pass or fail is informed of or received by the applicant (the caller) alone. Therefore, each player can apply for the audition without worrying about any other persons. In addition, the total personal identification information is included in the total personal password encrypted and may be plagiarized by any other person who may be called a plagiarizer. In this event, even when such a plagiarizer accesses the center side through a cell phone of the plagiarizer by using the total personal password of any other person, the center side can easily judges that a caller is not authentic.

Although the above description has been made about the case where this invention is applied to the audition, this invention is applicable to the case where a notice about a test result is delivered only to each examinee in schools or coaching schools. Specifically, the above-mentioned parameters are formed by answers of examinations and may be produced in the form of the total personal password.

Figure 3:
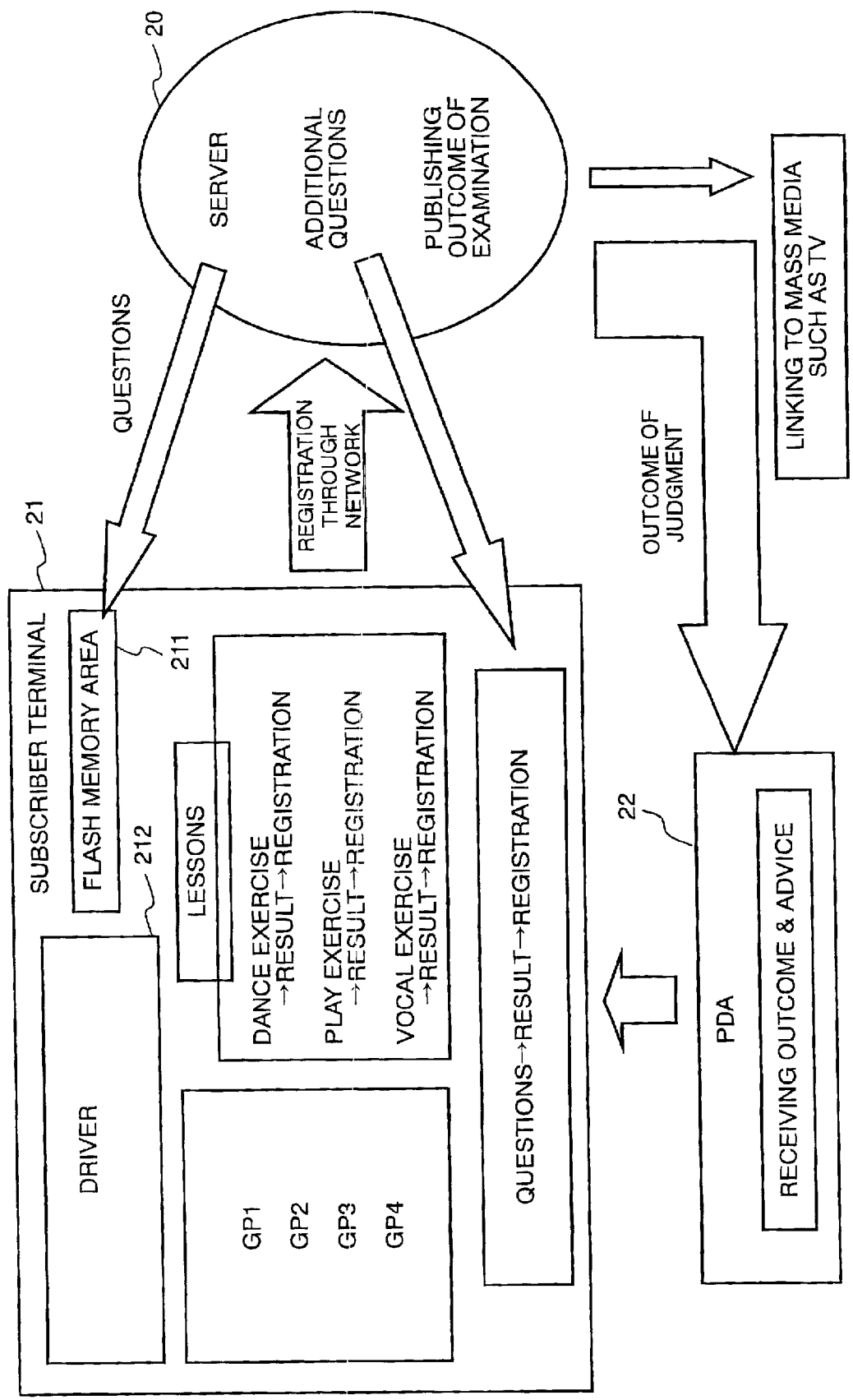
FIG. 3 shows a block diagram for use in describing a communication system according to another embodiment of this invention.

Referring to FIG. 3, a communication system according to another embodiment of this invention has a server 20 and a subscriber terminal 21 which is connected through a network (not shown) and which may be, for example, a personal computer, or the like. In the illustrated example, it is assumed that the subscriber terminal 21 is given a user name and a password from the illustrated server 20 in advance and has a rewritable flash memory area 211 and a driver 212, such as a CD-ROM driver, for driving a recording medium, such as a CD-ROM.

The illustrated flash memory 211 of the subscriber terminal 21 is loaded with questions and/or games which are previously transmitted from the server 20. Under the circumstances, a subscriber who is possessed of the illustrated subscriber terminal 21 exercises or practices the given questions or games to send results of the exercise or practice to the server 30 through the network.

The server 20 judges the results of the exercise or practice. In the illustrated example, the subscriber can be easily identified by the server 20 because the user name and password are assigned to each subscriber and are registered in the server 20. In this case, fair judgement can be accomplished by encrypting the results of the exercise or practice by the use of a predetermined algorithm. This is because the results of the exercise or practice can not be modified or altered by the subscriber itself.

In this event, a phone number assigned to a cell phone 22 possessed by the subscriber may be sent from the subscriber terminal 21 to the server 20 together with the results of exercise or practice like in FIGS. 1 and 2. With this structure, the server 30 can individually deliver a result of judgement to each subscriber through a wireless channel at a real time.

In the illustrated example, when the results are transmitted from the subscriber terminal 21 and received by the server 20, the server 20 judges the results of exercise or practice to transmit the outcome of judgement to the subscriber terminal 21 directly or to the cell phone 22 of the subscriber.

With this communication system, each subscriber can select a preferable program from programs, such as game programs depicted by GP1 to GP4 in FIG. 3, and can make sure of the results of exercise or practice obtained by exercising a selected one of the game programs. On the other hand, the server 20 can transmit, to subscribers, various games and/or questions prior to audition on demand and can gather applicants. Moreover, the outcome of examination in the server 20 may be released in public through mass media, such as TV, etc. Such a public release is very helpful to augment interest of the applicants to the illustrated communication or audition system.

Thus, this invention is advantageous in that each individual can be accurately identified by utilizing a function of a cell phone and necessary information can be delivered only to a person identified. The result or outcome of judgement or examination can be privately sent to each applicant alone by using a portable digital assistant (PDA) device, such as a cell phone. Consequently, each applicant can know about a rank or level at any place where. The communication system illustrated in FIG. 3 can vary the games or questions by the server from time to time, if necessary.

What is claimed is:

1. An audition system comprising a program processing device for processing a program stored in a recording medium attached thereto and a cell phone communicable with the program processing device, and assigned with a cell phone number, the audition system carrying out a preliminary examination involving a predetermined workout exercised by a person before an audition to screen candidates;

the program processing device comprises:
means for inputting personal identification information representative of a person using the recording medium;
means for executing the program to produce personal record data as a result of executing the program;
means for generating a total personal password which comprises the personal identification information and the personal record data;

the cell phone comprising:
means for transmitting the total personal password.

2. An audition system as claimed in claim 1, wherein the program processing device is implemented by a portable game machine while the program is a game program for the mobile game machine.

3. A method of implementing an audition system, which includes carrying out a preliminary examination involving a predetermined workout exercised by a person before an audition, via communication between a center side and a cell phone that is assigned a cell phone number and that installs a calling number display service for displaying a cell phone number on the center side, the method comprising the steps of:

obtaining, as personal record data, a result of the workout exercised by the person;
producing a total personal password which carries the personal record data and personal identification information comprising at least the cell phone number;
calling the center side from the cell phone to display the cell phone number on the center side;
transmitting the total personal password to the center side by the use of the cell phone; and
collating, on the center side, the displayed cell phone number with the cell phone number obtained from the total personal password to identify the person.

4. A method as claimed in claim 3, further comprising in the center side the steps of:
receiving the total personal password;
extracting said personal identification information from the total personal password as a detected personal identification information; and
collating the detected personal identification information with the personal identification information received from the cell phone and specified by a cell phone number to detect whether or not both are coincident with each other and to confirm whether or not the person is authorized.

5. A method as claimed in claim 4, further comprising the steps of:
judging the personal record data included in the total personal password to produce a result of judgment from the result of the workout, only when the detected personal identification information is coincident with the received personal identification information and the person is authorized; and
transmitting the result of judgment from the center side only to the cell phone specified by the received personal identification information.

6. A method as claimed in claim 5, comprising the steps of:
judging that the person is not authorized when the detected personal identification information is not coincident with the received personal identification information; and
carrying out neither judgment of the personal record data nor transmission of any data to the person when in-coincidence is detected between the detected personal identification information and the received personal identification information.

7. A method as claimed in claim 3, wherein the personal record data are representative of the result of the workout obtained by exercising a predetermined program designated by the center side.

8. A method as claimed in claim 7, wherein the predetermined program comprises the steps of:
producing the personal record data by practicing a game; and
generating the total personal password from the personal identification information and the personal record data.

9. A method as claimed in claim 7, wherein the predetermined program comprises the steps of:
executing a predetermined educational program to obtain, as the result of the workout, a result of executing the predetermined educational program and to generate the result of executing as the personal record data; and
generating the total personal password from the result of executing and the personal identification information.

10. An audition system for use in executing a preliminary examination, involving a predetermined workout exercised by a person before an audition/test, by carrying out communication between a center side and a cell phone of a person and assigned with a cell phone number, wherein:

the cell phone comprises:
transmitting means for transmitting a total personal password comprising the cell phone number and personal record data, said personal record data representing a result of a workout exercised by the person, to the center side;

the center side comprising:
means for receiving the total personal password;
means for extracting the cell phone number from the total personal password as a detected cell phone number; and
means for collating the detected cell phone number with the cell phone number received from the cell phone, to detect whether or not both are coincident with each other and to confirm whether or not the person is authorized.

11. An audition system as claimed in claim 10, further comprising:
means for judging the result of the workout included in the total personal password to produce a result of judgment, only when the detected cell phone number is coincident with the received cell phone number and the person is authorized; and
means for transmitting the result of judgment from the center side only to the cell phone specified by the received cell phone number.

* * * * *